C. E. ANABLE.
LOCKING DEVICE.
APPLICATION FILED MAY 31, 1919.
1,329,691.
Patented Feb. 3, 1920.
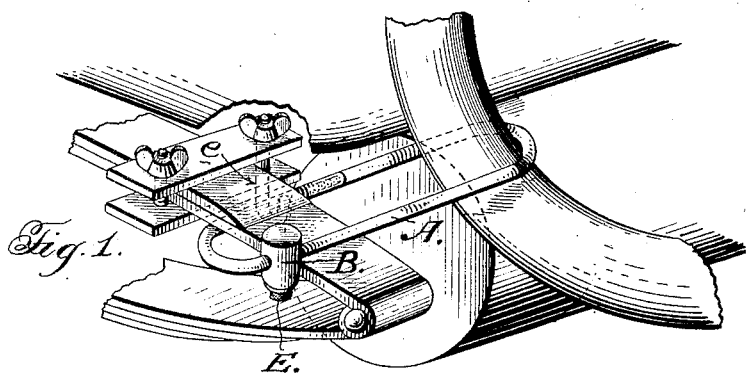
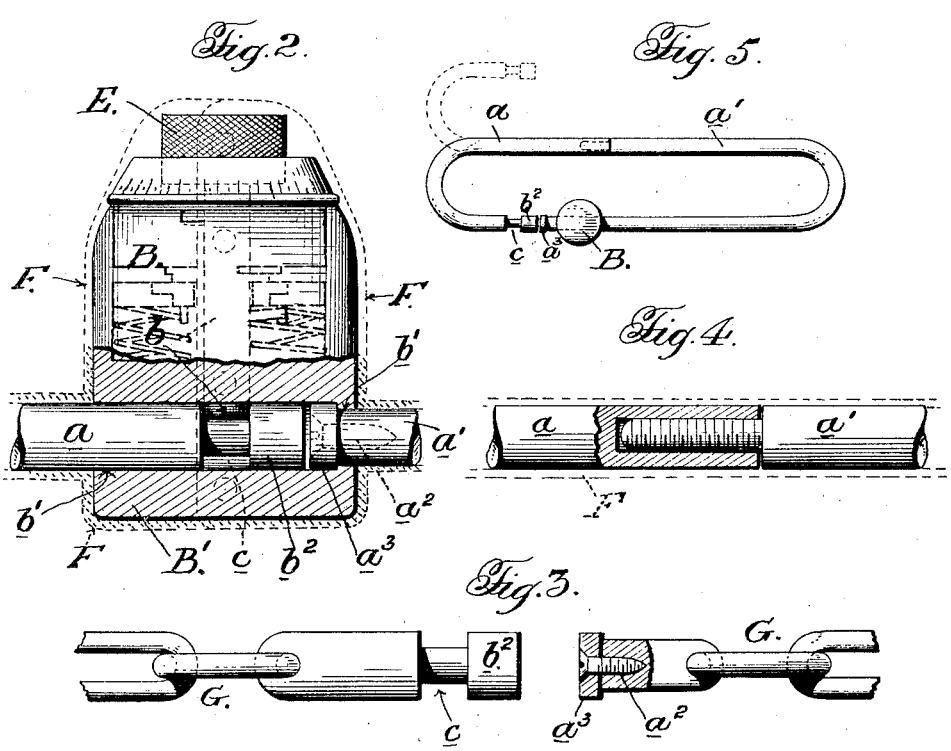
Witness:
Jas. E. Hutchinson
Inventor:
Clarence E. Anable.
By T. Walter Fowler, Attorney

UNITED STATES PATENT OFFICE.

CLARENCE E. ANABLE, OF SACRAMENTO, CALIFORNIA, ASSIGNOR, BY DIRECT AND MESNE ASSIGNMENTS, TO ABLE MFG. CO., A CORPORATION OF CAILFORNIA.

LOCKING DEVICE.

1,329,691.  Specification of Letters Patent.  Patented Feb. 3, 1920.

Application filed May 31, 1919. Serial No. 300,904.

*To all whom it may concern:*

Be it known that I, CLARENCE E. ANABLE, a citizen of the United States, residing at Sacramento, in the county of Sacramento and State of California, have invented certain new and useful Improvements in Locking Devices, of which the following is a specification.

My invention relates to certain new and useful improvements in locking devices adapted to prevent the pilfering of an automobile, bicycle or other vehicle spare tire, or other separate part, and my invention consists of the device and the arrangement and combination of parts constituting the same, which I will hereinafter describe and claim.

In the accompanying drawing forming a part of this specification and in which similar reference characters indicate like parts in the several views, Figure 1 is a perspective view illustrating one use of my invention and showing the same applied to the spare tire and elliptical spring of an automobile.

Fig. 2 is an elevation of a lock partially broken away and showing meeting ends of the divided shackle locked in place.

Fig. 3 illustrates a modified form of shackle.

Fig. 4 is a detail partially in section showing the swiveled joint of the shackle.

Fig. 5 is a plan view of the locking device showing the ends of the shackle unlocked.

Heretofore, various means have been employed as safety devices for preventing the unlawful abstraction or pilfering of the spare tire which is usually carried on the back or side of the vehicle body. Many of these devices are objectionable because of their complicated nature, while most of them are open to the further objection that they do not offer adequate means of preventing the destruction, by cutting or otherwise, of the securing devices and hence considerable loss and much annoyance has been entailed by reason of the unauthorized taking of the spare tire, the security of which must necessarily depend upon the means employed for fastening it in its position.

In the present case I have shown my improved device as being detachably connected to one of the elliptical body-supporting springs of an automobile, and to the spare tire, the construction of the device and the material employed therein being such as experience has shown, that the attempts of unauthorized persons to remove the spare tire have been effectually resisted.

While the device is shown as applied in one position and in association with the elliptical spring of the vehicle, it will be apparent that the invention might be otherwise used, and hence I wish it understood that I do not limit the application of my safety appliance to any particular part of the vehicle, it being only necessary that the spare tire, and the extra rim, if such is used with the tire, should be embraced by the locking device.

The device shown for illustrative purposes comprises two essential parts, namely, a divided shackle or loop-shaped element, A, which, preferably, is formed of a plurality of parts and wherein one part is swiveled or turnable relatively to the other to thus open the eye of the loop to enable the device to detachably embrace the spare tire supported in its usual position; and second, a combination lock, the casing, B, of which is swiveled or loosely mounted on one end of one part of the shackle or loop-shaped member, A, said casing being bored transversely to receive the adjacent ends of the divided shackle or loop-shaped member and the upper part of the lock casing being provided with those features which usually constitute a combination lock. The character and construction of the interior of the lock are unimportant as different arrangements may be used for the purpose. If desired, I may employ the construction of lock substantially as shown and described in my prior Patents Nos. 1,312,938 and 1,312,939, dated August 12, 1919, but any of the well known tumbler or pin-locks usually employed for combination purposes may be used in connection with the lock casing shown, it only being essential that the lock shall comprise a longitudinally movable and, preferably, axially turnable bolt, $b$, which is designed to enter a groove or channel formed in one of the meeting ends of the divided shackle or loop-shaped member as I will hereinafter more fully disclose.

The divided shackle or loop-shaped member is shown in Figs. 1 and 2, as comprising two substantially U-shaped parts, $a$, $a'$, each of which may have one leg longer than the other, said parts being jointed or swiveled so that one part may be turned axially relatively to the other to open the divided free ends of the shackle and to enable said shackle to be readily slipped over and made to embrace the spare tire and vehicle spring.

One end of the divided shackle is provided with a screw, $a^2$, or head and, preferably, a loose washer, $a^3$, said end of the shackle adapted to enter from one side a hole or bore, $b'$, made transversely through the lock casing, B, and said washer serving as an abutment to prevent the lock casing from being detached from the end of the shackle. The other end of the shackle is adapted to enter from the opposite side the hole or bore $b'$, formed in the lock casing, the diameter of the hole or bore on this side of the casing in this instance being, preferably, slightly larger than the entrance thereto from the other side of the casing, this end of the shackle being grooved at $c$, to form an annular channel into which the locking bolt, $b$, of the combination lock may be projected, to thus secure the shackle in its locked position, this channeling or grooving, $c$, of the shackle forming a collar or disk, $b^2$, which is adapted to abut the opposite end of the divided shackle when the two parts thereof have been closed together and secured by the operating elements of the lock.

The lock proper comprises a casing, B, the bottom of which is formed substantially as a solid block, B', and through this portion is made the transverse bore or opening, $b'$ for the divided ends of the shackle. Above this solid portion the lock is designed to contain the usual tumblers, pins, or other elements of a combination lock. These are not shown as they form no part of the present invention, and it being sufficient to say that the locking pin is fixed to and carried by a head or disk, E, which projects through the upper end of the lock casing and serves as the means for operating the tumblers or like mechanism and rotating and longitudinally moving the aforesaid locking bolt, $b$. In this respect the locking bolt and its head and co-acting parts may follow more or less closely the corresponding elements and type of lock of my aforesaid prior patents.

The divided shackle or loop-shaped member and, if desired, the lock casing, itself, are constructed of a high grade of tempered steel which experience has shown successfully resists the attempt of unauthorized persons to cut or destroy the shackle and thus release the spare tire, thus giving that security to the tire which the owner of the vehicle so greatly needs.

In order to protect the internal mechanism of the lock from the weather, the lock casing is, as before explained, preferably, swiveled on one end of the divided shackle so that it normally swings downward with its outer end, i. e., that part containing the numerals or other indications which are employed in the various combinations, presented downwardly; and to give added security against the weather, I prefer to inclose the shackle and also the lock casing, in a sheath or covering F of leather or water proof material, having suitable fastenings for securing it in place.

In operation, the lock is opened by the party knowing the proper combination and the longitudinally slidable bolt is lifted out of its engagement with the annular groove formed on one end of the divided shackle. The shackle may now be opened by sliding the lock casing back on the other part of the divided shackle, the bore through the lock casing providing for this movement, when the disengaged end of the shackle may now be turned sidewise, thus opening the eye of the shackle and enabling the now open shackle to be placed about or made to embrace the spare tire. The other end of the shackle may be passed through the usual elliptic spring of the vehicle and then the open end of the shackle may be brought into its closed position into register with the bore or opening through the lock casing and the casing then moved forward so as to inclose this end of the shackle and to cause the annular groove, $c$, to register with the inner end of the sliding bolt of the lock. The lock is now operated to move the bolt inwardly into engagement with the groove, when the parts of the shackle are securely united and the lock cannot be opened by one not familiar with the combination.

Such a means as I have disclosed may be made in different sizes to meet actual needs and makes of tires, and it provides an effective safety appliance for the spare tire of an automobile or other part which it is desired to secure in a fixed position, while the arrangement employed is of a simple character and composed of few parts and may be made and sold at a reasonable price, and as before explained, the material of which the shackle is constructed is of such a character that it cannot be cut or severed by any tool now used and which tools have been found so destructive of other devices intended for securing spare tires in their proper places on the vehicle.

If desired, a link chain, G, may be substituted for the divided shackle, as shown in Fig. 3, the terminal links of the chain being fashioned similarly to the adjacent ends of the shackle. This chain it will be understood may be used in situations where the use of the shackle might be difficult, if not impossible.

The portion of the divided shackle which embraces the upper member of the elliptic spring, may be fixed against movement, although permitted axial movement as before described, by employing one or more J-bolts,

*e*, or like fastenings, substantially as shown in Fig. 1, and in the open eye of which this end of the shackle may turn to open and close the shackle. This mode of fastening overcomes the objection to rattling due to loose connection which is so often present in devices intended for similar purposes.

Having thus described my invention what I claim as new and desire to secure by Letters Patent is:—

1. A locking device comprising a divided member adapted to be passed around a part to be secured and around another and distant fixed part, and a lock having a casing with a thickened base, said base having a continuous transverse bore of two diameters, one of the terminals of said member having two diameters to fit both diameters of said bore and the other terminal of said member adapted to enter the bore in line with the first-named terminal, and having an annular groove, said lock casing having a bolt adapted to engage with said groove.

2. A locking device comprising a divided member of greater length than width adapted to be passed around a part to be secured and around another and distant fixed part, and a lock having a casing provided with a bore of two diameters, one of the terminals of the divided member having two diameters to fit both diameters of said bore, and the other terminal of said member adapted to enter the bore in line with the first named terminal and having an annular groove, said lock having a bolt adapted to interlock with said groove, said divided member being also jointed between its terminals to allow one section or part to be turned axially relatively to the other part or section.

3. The combination of a loop-shaped member or divided shackle the sections of which are formed of hardened metal, and a lock casing located between the divided ends of the shackle, said casing having a thickened base bored transversely to receive the alined divided ends of said member or shackle, one of said ends having a shoulder and the other end having an annular groove, said lock casing having a longitudinally movable bolt adapted to engage said groove, and having an interior seat for said shoulder whereby the casing is loosely retained on one terminal of the member or shackle and capable of longitudinal movement relatively to said retaining member.

4. A locking device comprising a divided shackle formed of substantially U-shaped portions one swiveled to the other and capable of being turned transversely thereto, and a lock interposed between the divided ends of the shackle, and comprising a casing and a rotatable and longitudinally movable bolt, said casing having a thickened base bored transversely, means on one terminal of the divided shackle for loosely retaining the lock casing in place thereon and permitting the casing to be moved longitudinally of the shackle, and means on the other terminal of the shackle adapted to enter the bore of the casing and to register with and to be engaged by said bolt.

5. A locking device comprising a divided member having greater length than width and having one of its parts swiveled relatively to the other part so that it may be opened out laterally therefrom, a lock between the divided ends of said member, said lock having a casing with a bore made transversely through it and of two diameters, one of the terminals of the member fitting both diameters of said bore and loosely retaining the lock thereon, said lock swiveling on said terminal and having a sliding movement longitudinally thereof, and the other terminal of said member fitting one of the diameters of said bore and having an annular groove, said lock casing having a bolt to engage said groove.

6. A locking device comprising a divided member elongated in one direction and a lock casing between the divided ends thereof, said casing being swivelly mounted on one terminal so as to maintain the casing normally in an inverted position and having a locking bolt to engage the other terminal, and having a transverse bore in which the said terminals are alined, one of the parts of said member being swiveled to the other part and capable of being turned transversely thereof, the parts of said member adapted to embrace a spare tire and the elliptic spring of a vehicle, and means for securing an intermediate part of said member to said spring.

In testimony whereof I affix my signature.

CLARENCE E. ANABLE.